United States Patent [19]

Fujioka et al.

[11] 4,119,183

[45] Oct. 10, 1978

[54] CLUTCH

[75] Inventors: Hisatake Fujioka; Tomeo Umemoto, both of Sakai; Masamitsu Shingaki, Kishiwada, all of Japan; Mikio Yuki, Vichy, France; Mitsuhiro Sato, Sakai; Shosuke Kawabata, Osaka, both of Japan

[73] Assignee: Kubata Ltd., Japan

[21] Appl. No.: 730,318

[22] Filed: Oct. 7, 1976

[30] Foreign Application Priority Data

Apr. 5, 1976 [JP] Japan .................................. 51/38418

[51] Int. Cl.$^2$ ............................................ F16D 11/06
[52] U.S. Cl. .................................................. 192/24
[58] Field of Search ................... 192/24, 25, 49, 48.8; 180/76, 6.7

[56] References Cited

U.S. PATENT DOCUMENTS

| 1,599,046 | 9/1926 | Good | 192/24 |
| 2,881,887 | 4/1959 | Faas | 192/48.8 |
| 3,207,251 | 9/1965 | Putnam et al. | 192/49 X |
| 3,270,842 | 9/1966 | Pinto | 192/48.8 |
| 3,539,044 | 11/1970 | Grimstad | 192/21 X |
| 3,572,483 | 3/1971 | Giguere | 192/49 X |

FOREIGN PATENT DOCUMENTS 4,712,407  5/1972  Japan.

Primary Examiner—William F. O'Dea
Assistant Examiner—Larry Jones
Attorney, Agent, or Firm—Kane, Dalsimer, Kane, Sullivan and Kurucz

[57] ABSTRACT

A clutch comprising a drive rotary member, a driven rotary member engageable with and disengageable from the drive rotary member by being moved relative thereto in the directions of axis of rotation, an annular cam interposed between the drive rotary member and the driven rotary member, and an engaging member manually operably mounted on a case to prevent rotation of the cam. When the engaging member is operated to project toward the driven rotary member through the cam, the driven rotary member is held out of engagement with the drive rotary member reliably.

1 Claim, 7 Drawing Figures

CLUTCH

BACKGROUND OF THE INVENTION

The present invention relates to improvements in a clutch comprising a drive rotary member, a driven rotary member engageable with and disengageable from the drive rotary member by being moved relative thereto in the directions of axis of rotation, the driven rotary member being biased toward the drive rotary member for engagement therewith, an annular cam interposed between the drive rotary member and the driven rotary member and rotatable about the axis of rotation, and an engaging member manually operable mounted on a case to prevent rotation of the cam, the driven rotary member and the cam being formed in facing relation to each other with wave-shaped cam surfaces respectively, the driven rotary member and the cam being rotatable relative to each other to permit the cam surfaces to ride on each other, whereby the driven rotary member is forced away from the drive rotary member.

The clutch of the type described has the feature of being smoothly and accurately engageable and disengageable as desired by a small force which is derived from the torque of the drive rotary member to operate the engaging member alone. However, since the wave-shaped cam surfaces are used to displace the driven rotary member, the clutch is liable to produce noises and vibrations when disengaged.

More specifically, the wave-shaped cam surfaces formed in face-to-face relation on the cam and the driven rotary member respectively are so adapted that the crest portions of the cam contact each other when the driven rotary member is forced away from the drive rotary member in the direction of axis of rotation. Accordingly the crest portions tend to be out of contact, permitting repeated engagement of the wave-shaped cam surfaces due to the overrun of the driven rotary member and consequently producing noises and vibrations. This invention intends to overcome these problems.

SUMMARY OF THE INVENTION

The clutch according to this invention comprises a drive rotary member, a driven rotary member engageable with and disengageable from the drive rotary member by being moved relative thereto in the directions of axis of rotation, the driven rotary member being biased toward the drive rotary member for engagement therewith, an annular cam interposed between the drive rotary member and the driven rotary member and rotatable about the axis of rotation, an engaging member manually operably mounted on a case to prevent rotation of the cam, the driven rotary member and the cam being formed in facing relation to each other with wave-shaped cam surfaces respectively, the driven rotary member and the cam being rotatable relative to each other to permit the cam surfaces to ride on each other, whereby the driven rotary member is forced away from the drive rotary member, wherein the driven rotary member is formed with a groove to hold the driven rotary member out of engagement with the drive rotary member when the extreme end of the engaging member projects toward the driven rotary member through the cam and is engaged with the groove.

Thus, the clutch of this invention is engageable and disengageable with a small force utilizing the torque of the drive rotary member. Furthermore when the clutch is in its disengaged position, with the driven rotary member disengaged from the drive rotary member, the extreme end of the engaging member locking the cam prevents the driven rotary member from returning to the engaged position of the clutch, so that even when the driven rotary member is disengaged position overruns due to inertia, repeated engagement will not take place between the wave-shaped cam surface of the cam and the wave-shaped cam surface of the driven rotary member. Therefore, the clutch is free of noises and vibrations due to the repeated engagement.

An object of this invention is to provide a clutch which is operable effectively with the foregoing features while the wave-shaped cam surfaces free of any noises and vibrations.

Another object of this invention is to provide a clutch which is operable with a small force.

Other objects and advantages of this invention will be apparent from the embodiment described hereinafter.

An embodiment of this invention will be described below in detail with reference to the accompanying drawings.

Figure 1:
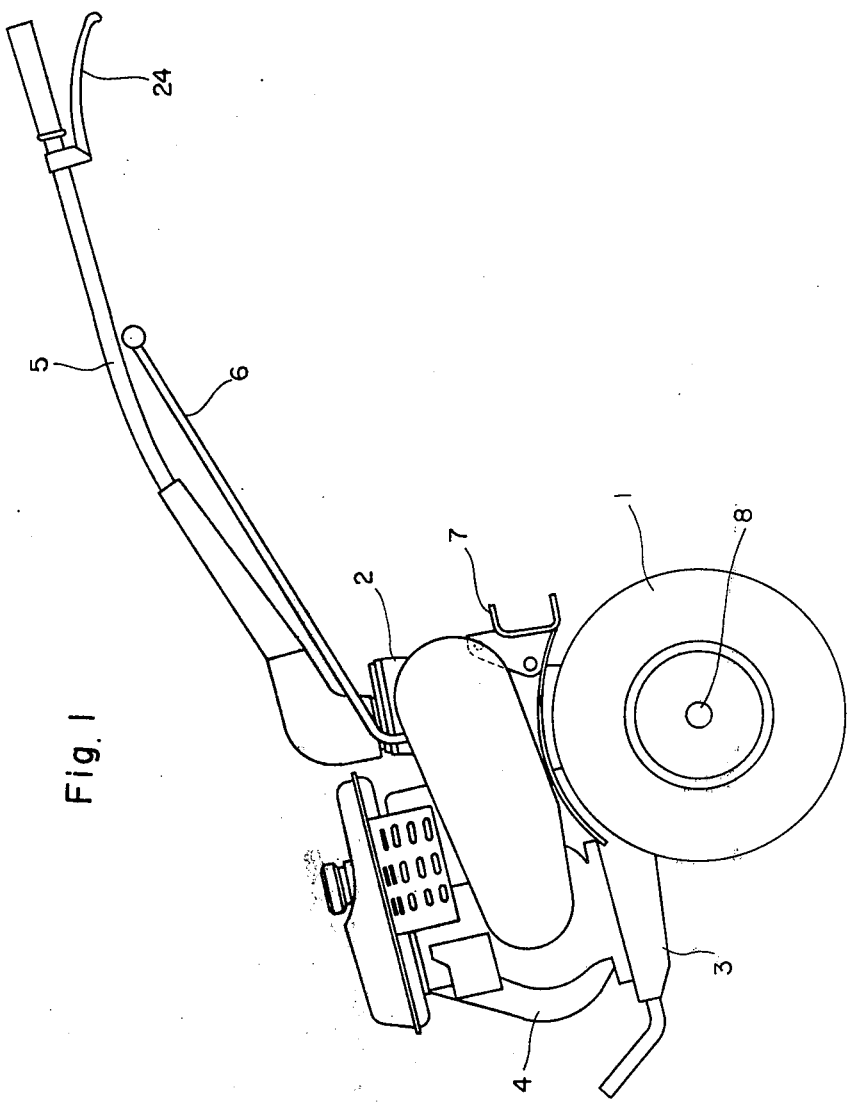
FIG. 1 is a side elevation of a tiller to be operated by a walking person.
Figure 2:
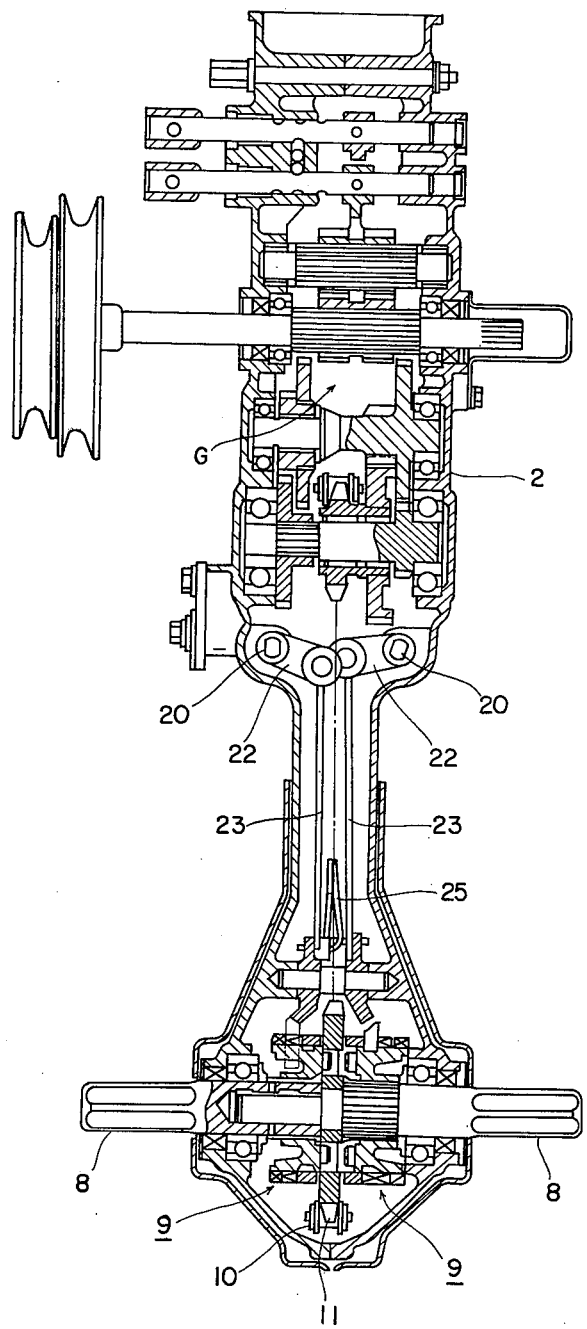
FIG. 2 is a front view in vertical section showing a transmission case.
Figure 3:
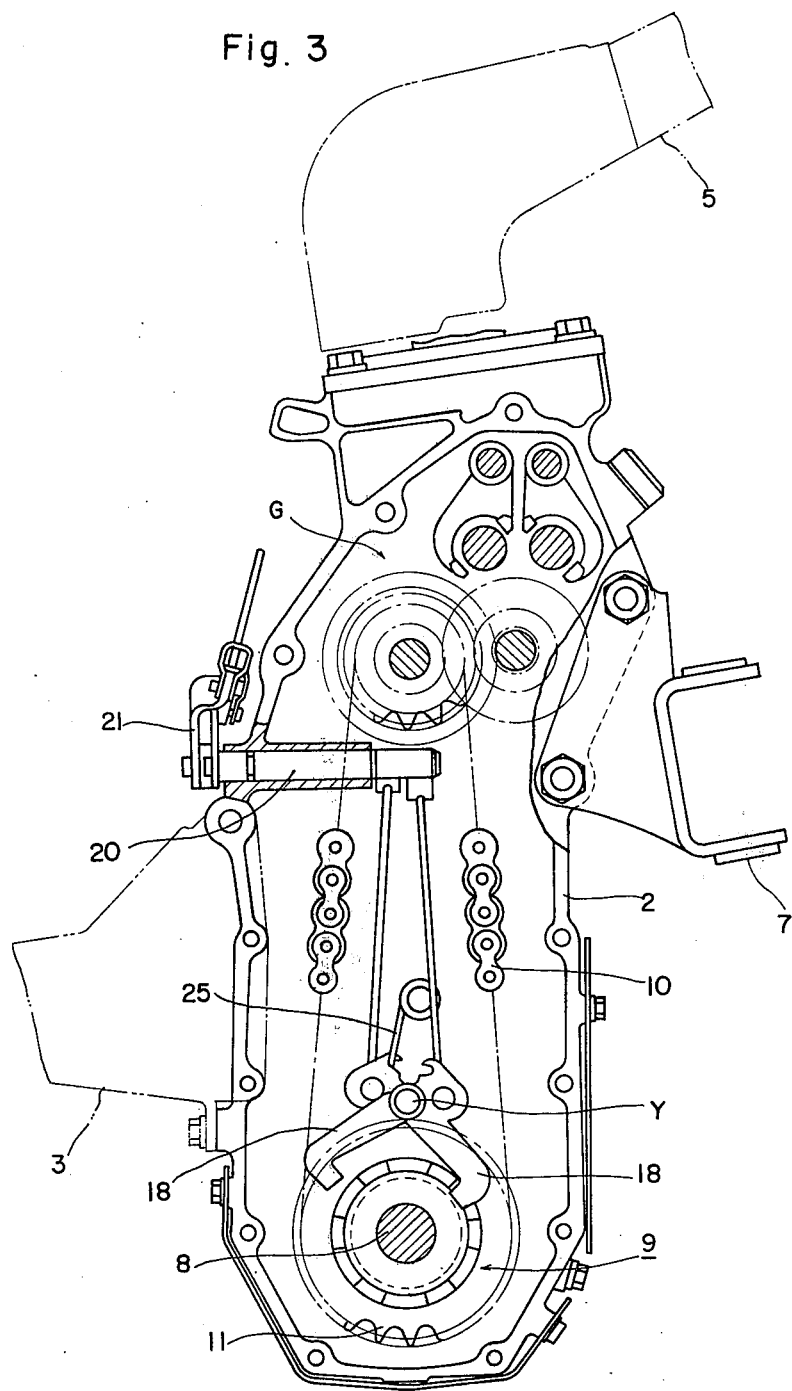
FIG. 3 is a side elevation in vertical section showing the transmission case.

The tiller shown in FIG. 1 comprises a transmission case 2 equipped with a pair of opposite wheels 1, 1, an engine 4 disposed in front of the transmission case 2 and mounted on a front frame 3, a steering handle 5 and a change lever 6 connected to the upper portion of the transmission case 2, a hitch 7 secured to the rear of the transmission case 2 for connecting an attachment, etc.

Figure 4:
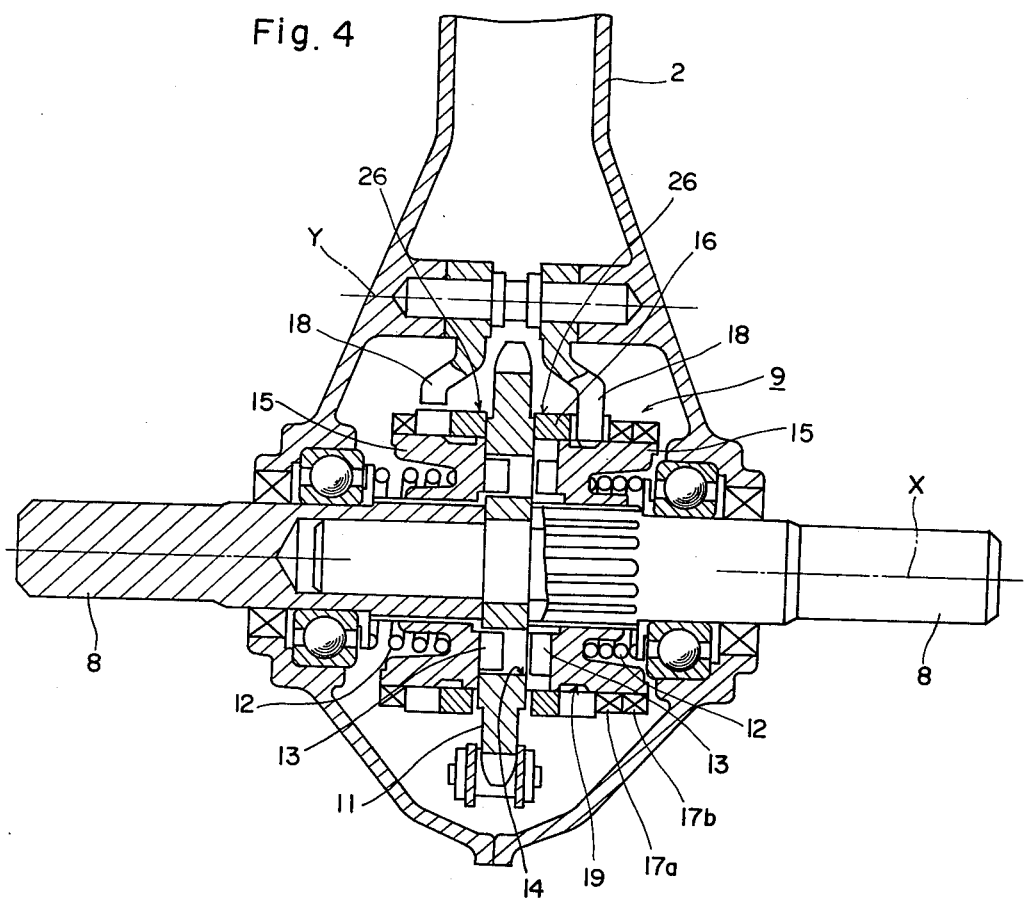
FIG. 4 is a front view in vertical section showing a steering clutch assembly.
Figure 5:
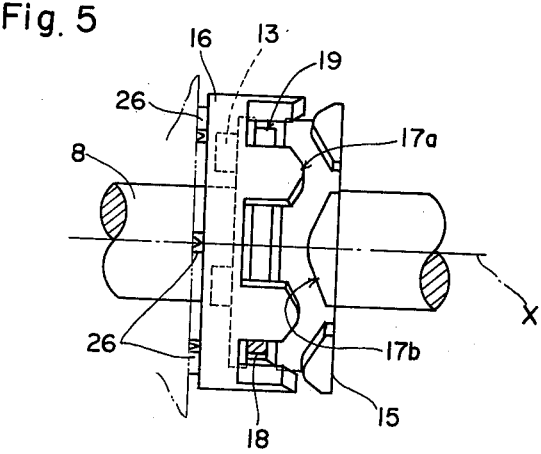
FIG. 5 is a front view showing part of the steering clutch.

The transmission case 2 composed of a pair of divided segments supports at its lower portion a pair of opposite axles 8, 8 which are fitted together end-to-end within the case 2. Steering clutches 9, 9 (see FIG. 4) of the construction to be described below effects or discontinues power transmission to the axles 8, 8 to steer the tiller.

Freely rotatably mounted on the joint of the axles 8, 8 is a drive rotary member (sprocket) 11 to be driven by the power of the engine 4 delivered thereto through a chain 10 after the power has been subjected to the desired speed change by speed change gear means G at an upper inside portion of the transmission case 2.

Driven rotary members 15, 15 mounted on the axles 8, 8 are biased by springs 12, 12 toward the drive rotary member 11 and have pins 13 which project toward the drive rotary member 11 and which are engageable in holes 14 formed in the drive rotary member 11. The driven members 15, 15 are splined to the axles 8, 8 slidably in the directions of axis X of rotation. The clutch 9 is disengaged by the following construction.

An annular cam 16, rotatable about the axis X, is provided between the drive rotary member 11 and the driven rotary member 15 and is in sliding contact with a side surface of the drive rotary member 11. The cam 16 and the driven rotary member 15 are formed, in facing relation to each other, with wave-shaped cam surfaces 17a, 17b respectively.

An engaging member 18 opposed to the cam 16 is attached to the transmission case 2 pivotably about a support axis Y parallel to the axis X of rotation. The cam 16 is cut out in directions perpendicular to the axis X to form recesses in the cam surface 17a. The engaging member 18 is movable through the recess from outside.

When projected toward the axis X through the recess in the cam surface 17a, the engaging member 18 prevents the rotation of the cam 16 about the axis X, permitting the cam 16 and the driven rotary member 15 to rotate relative to each other, with the result that both the wave-shaped cam surfaces 17a, 17b act to move the driven member 15 away from the drive member 11 against the force of the spring 12 to disengage the pins 13 from the holes 14. Furthermore, the end of the engaging member 18 projected toward the axis X through the recess of the cam surface 17a engages in a groove 19 formed in the peripheral surface of the driven member 15 moved to the disengaged position of the clutch, holding the driven member 15 in the disengaged position against return movement toward the engaged position of the clutch.

Further, the cams 16 are so placed that a plurality of projections 26 which are formed on the side walls of the cams 16 facing the drive rotary member 11 touch the side walls of the drive rotary member 11. These projections 26 are arranged circumferentially about the axis X of rotation. The projections 26 of the cams 16 scrape lubricating oil off the side walls of the drive rotary member 11 when the drive rotary member rotates relative thereto. Such scraping produces a strong frictional force between the side walls of the drive rotary member 11 and the projections 26. Due to the projections 26, the cams 16 are slightly turned under a rotating force of the drive rotary member 11 to thereby facilitate the engagement of the clutches 9 by means of the springs 12 when grip levers 24 are released to engage the clutches 9. This is possible by the arrangement in which a frictional force between the projections 26 and the side walls of the drive rotary member 11 is stronger than that between the wave-shaped cam surfaces 17a and 17b.

The engaging member 18 is adapted to be operated from outside the transmission case 2 as will be described below.

The transmission case 2 supports lever rods 20, 20 positioned in a direction perpendicular to the support axis Y and provided with lever arms 21, 21 secured to the portions thereof extending outward from the case. The pivotal movement of each of the lever arms 21 moves an arm 22 secured to the portion of the lever arm 21 positioned within the case, swinging the engaging member 18 connected by a wire 23 to the arm 22. The lever arms 21, 21 are operatively connected by release wires to opposite grip levers 24, 24 mounted on the handle 5 close to its opposite grips respectively. When the grip lever 24 is grasped, the engaging member 18 is swung toward the cam 16, whereas when the grip lever 24 is released, the engaging member 18 is moved backward away from the cam 16 by a return spring 25.

According to the construction described, the opposite clutches 9, 9 usually transmit the torque of the drive rotary member 11 to the opposite axles 8, 8, with the pins 13 on the driven rotary members 15, 15 engaged in the holes 14 in the drive member 11.

When the tiller is to be turned by interrupting the transmission of power to one of the axles 8, 8, one grip lever 24 is grasped, pivotally passing the engaging member 18 through the recess of the cam surface 17a as illustrated and thereby permitting relative rotation between the driven rotary member 15 rotating with the drive rotary member 11 in engagement therewith and the cam 16 which is prevented from rotation by the engaging member 18. Consequently the crest portions of the cam surfaces 17a and 17b contact with and ride on each other to slidingly displace the driven rotary member 15 away from the cam 16, forcing out the pins 13 from the holes 14, whereby the clutch is disengaged. Subsequently the end of the projected engaging member 18 engages in the groove 19 of the driven rotary member 15 and thereby restrains the driven member 15 from shifting to hold the clutch in its disengaged position.

To engage the clutch 9 again, the grip lever 24 is released to free the engaging member 18, whereupon the spring 25 pivotally moves the engaging member 18 backward out of engagement with the cam 16, while the spring 12 returns the driven rotary member 15 toward the drive rotary member 11. The clutch is thus engaged.

Furthermore according to this invention, the engaging member 18 engages the cam 16 in such state that the point of contact between the extreme end of the engaging member 18 and the cam 16 has the following relations with the rotation axis X and the support axis Y when the drive rotary member 11 rotates in positive direction and reverse direction.

Figure 6:
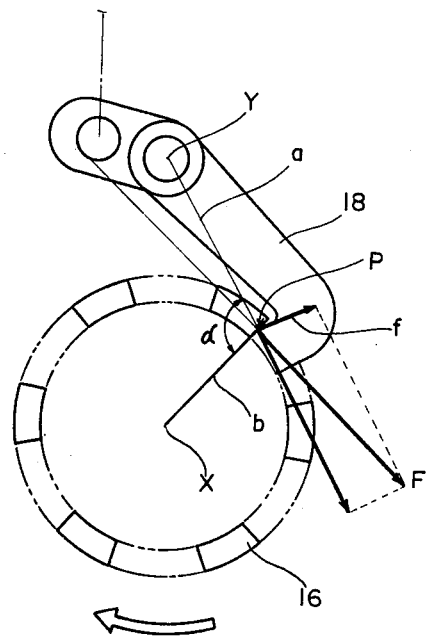
FIGS. 6 and 7 are side elevations showing the operation of the clutch in different directions of rotation.

When the cam 16 rotates in such state that the engaging member 18 is subjected to tension due to the rotation of the cam 16, the angle $\alpha$ between a line $a$ drawn from the point P of contact between the engaging member 18 and the cam 16 to the support axis Y, and a line $b$ drawn from the contact point P to the rotation axis X is determined to be from 90° to 115°, an example of which is, as shown in FIG. 6, 109°. When the cam 16 rotates in such state that the engaging member 18 is subjected to compression due to the rotation of the cam 16, the angle $\beta$ between a line $a'$ drawn from a point Q of contact between the engaging member 18 and cam 16 to the support axis Y, and a line $b'$ drawn from the contact point Q to the rotation axis X is determined to be from 65° to 90°, an example of which is, as seen in FIG. 7, 83°.

Figure 7:
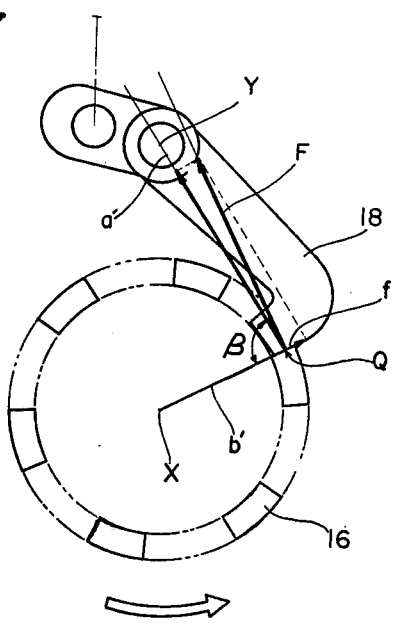

Accordingly, when the engaging member 18 is to be withdrawn from the cam 16 on disengagement of the end of the engaging member 18 from the groove 19 in the driven rotary member 15 to engage the clutch, the cam 16 is pressed against the side surface of the drive rotary member 11 by the return spring 12 and receives frictional torque from the drive rotary member 11, with the result that a force F shown in FIGS. 6 and 7 acts on the end of the engaging member 18. Consequently in either of the cases shown in FIGS. 6 and 7, a component $f$ of the force F in a direction perpendicular to the line $a$ or $a'$ produces a moment for releasing the engaging member 18 from the cam 16. The engaging member 18, which is given a return moment by the return spring 25 and return movement by the cam 16, disengages from the cam 16, overcoming the frictional resisting force acting at the contact point P or Q against the disengagement.

What we claim is:

1. A clutch comprising a drive rotary member, a driven rotary member engageable with and disengageable from the drive rotary member by being moved relative thereto in the direction of axis of rotation, the driven rotary member being biased toward the drive rotary member for engagement therewith, an annular cam interposed between the drive rotary member and the driven rotary member and rotatable about the axis of rotation, and an engaging member manually operably mounted on a case to prevent rotation of the cam, the driven member and the cam being formed in facing relation to each other with wave-shaped cam surfaces, the driven rotary member and the cam being rotatable relative to each other to permit the cam surfaces to ride on each other, whereby the driven rotary member is forced away from the drive rotary member, wherein the drive rotary member is formed with a groove to hold the driven rotary member out of engagement with the drive rotary member when the extreme end of the engaging member projects toward the driven rotary member through the cam and is engaged with the groove, characterized in that when the cam rotates in such state that the engaging member is subjected to tension due to the rotation of the cam, an angle $\alpha$ between a line $a$ drawn from a first point of contact between the engaging member and the cam to a support axis of the engaging member, and a line $b$ drawn from the first contact point to a rotation axis is determined to be from 90° to 115°, and when the cam rotates in such state that the engaging member is subjected to compression due to the rotation of the cam, an angle $\beta$ between a line $a'$ drawn from a second point of contact between the engaging member and the cam to a support axis of the engaging member, and a line $b'$ drawn from the second contact point to a rotation axis is determined to be from 65° to 90°.

* * * * *